No. 696,528. Patented Apr. 1, 1902.
DE VER H. WARNER.
SUPPORTING OR CONNECTING MEANS.
(Application filed Oct. 23, 1901.)
(No Model.)
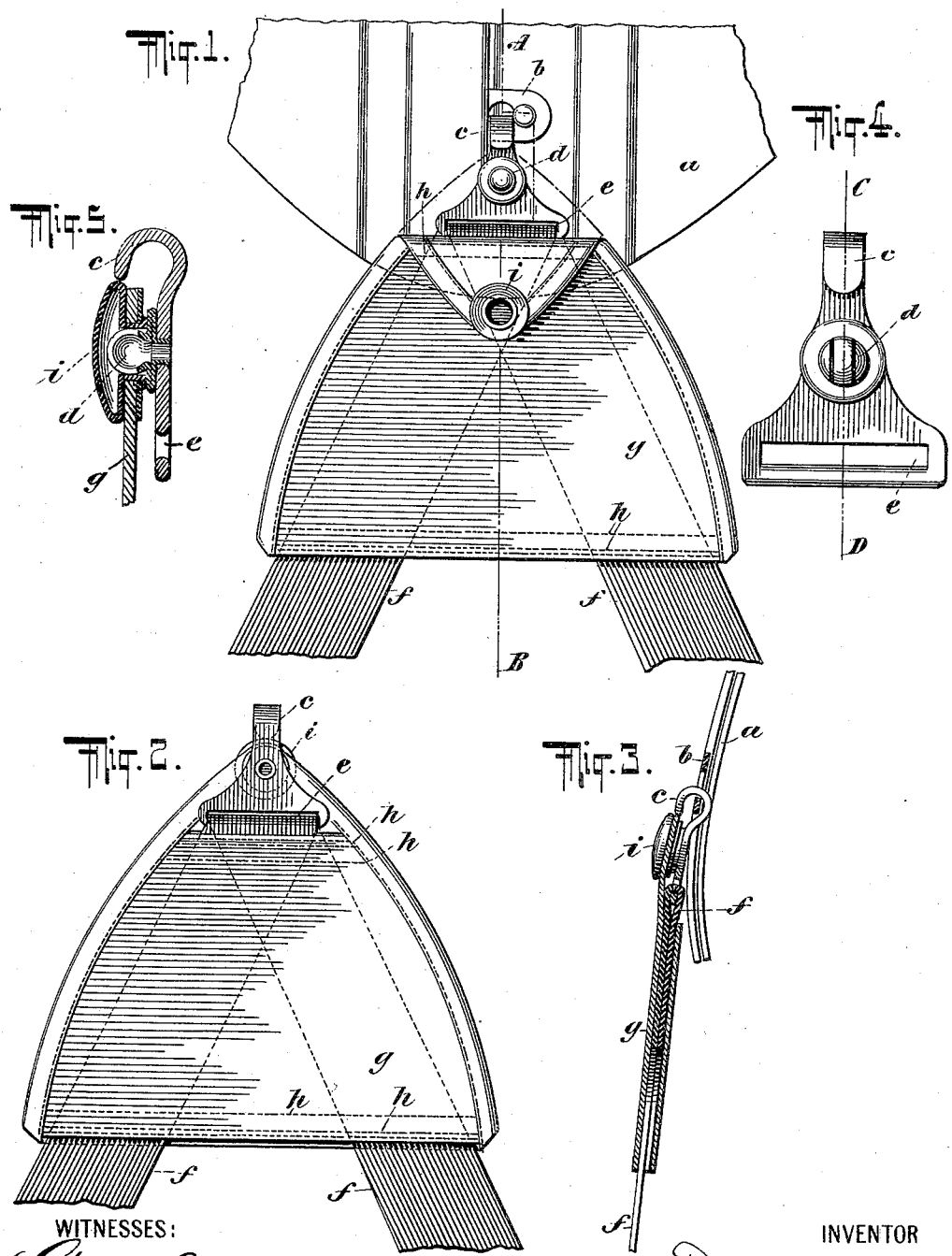
WITNESSES:
INVENTOR
BY
ATTORNEY

UNITED STATES PATENT OFFICE.

DE VER H. WARNER, OF BRIDGEPORT, CONNECTICUT, ASSIGNOR TO THE WARNER BROTHERS COMPANY, OF BRIDGEPORT, CONNECTICUT, A CORPORATION.

SUPPORTING OR CONNECTING MEANS.

SPECIFICATION forming part of Letters Patent No. 696,528, dated April 1, 1902.

Application filed October 23, 1901. Serial No. 79,646. (No model.)

*To all whom it may concern:*

Be it known that I, DE VER H. WARNER, a citizen of the United States, and a resident of Bridgeport, Fairfield county, Connecticut, have invented certain new and useful Improvements in Supporting or Connecting Means, of which the following is a specification.

My invention relates to improvements in supporting or connecting means, and is designed to provide a means of support or connection which will be simple, secure, and beyond the possibility of accidental disengagement, while at the same time it may be readily disconnected, if desired.

In the following I have described, with reference to the accompanying drawings, a structure embodying my invention, the features thereof being more particularly pointed out hereinafter in the claims.

The drawings illustrate my invention in connection with hose-supporting means adapted to be suspended from the eye of a corset-clasp, and the description refers particularly to this adaptation of my invention, although it is obvious that it may be readily adapted to other uses wherein such means of support or connection are desired.

Figure 1 shows my device in connection with hose-supporting means suspended from the eye of a corset-clasp, the locking means being disengaged. Fig. 2 is a rear view of the same detached from the corset-clasp. Fig. 3 is a sectional view of Fig. 1 along the line A B with the locking means engaged. Fig. 4 is a perspective, on an enlarged scale, of the hook portion of my device; and Fig. 5 is a sectional view of the same along the line C D of Fig. 4, showing also in section the locking device in connection therewith.

*a* represents the bottom portion of a corset, provided with the usual corset-clasp having an eyepiece *b*.

*c* represents a hook adapted in this instance to be engaged with the eye *b*, said hook having a shank provided with a stud *d*. The stud is so mounted on the shank that in connection with means hereinafter described it serves to close the mouth of the hook. A slot *e* in the shank of the hook is adapted to receive a tape *f*, which may act as the connecting means between the garment and the hook. A pad or piece *g*, preferably composed of several similarly-shaped pieces of flexible material stitched together at the edges, as shown, is secured to the tape by means of lines of transverse stitches *h h*, the doubled portion of the tape preferably projecting through a slit in said pad at a point near the top above the stitches. The flap of the pad above the stitches is provided with a socket *i*, adapted to snap over upon the stud *d* and in coöperation therewith close the mouth of the hook, the flap affording a convenient flexible means of support for the socket, the stitches acting as a hinge. It is obvious that the hook, with its shank, is hinged on the tape in such manner that it may readily be turned in position for engagement with the eye of the corset-clasp and that when the socket *i* is in position on the stud the hook cannot be disengaged from its support.

A supporting or connecting device such as I have described is useful not only in connection with hose-supporters, but in any connection in which such means of suspension or of connecting parts may be desired, such as connecting the tab ends of suspenders with the web, the fastening of carriage-curtains, and the like.

I do not desire to restrict myself to the details shown nor to the use illustrated; but

What I claim, and desire to secure by Letters Patent of the United States, is—

1. In supporting or connecting means, the combination of a hook, a stud adjacent thereto and a socket adapted to coöperate with said stud and close the mouth of the hook.

2. In supporting or connecting means, the combination of a hook bearing a stud on its shank, with a socket adapted to snap over said stud and close the mouth of the hook.

3. In supporting or connecting means, the combination of a hook bearing a stud on its shank, with a flexibly-mounted socket adapted to snap over said stud and close the mouth of the hook.

4. In supporting or connecting means, the combination of a hook bearing a stud on its shank, with means adapted to be connected with said hook and provided with a socket adapted to snap over said stud and close the mouth of the hook.

5. In supporting or connecting means, the combination of a hook bearing a stud on its shank, with means adapted to be connected with said hook, said means having a hinged flap provided with a socket adapted to snap over said stud and close the mouth of the hook.

In witness whereof I have hereunto signed my name in the presence of two subscribing witnesses.

DE VER H. WARNER.

Witnesses:
F. S. ANDREWS,
RUSSELL TOMLINSON.